Patented Apr. 4, 1950

2,503,204

UNITED STATES PATENT OFFICE 2,503,204

PROCESS FOR PRODUCING POLYPHOSPHORIC ACID ESTERS

Gennady M. Kosolapoff, Dayton, Ohio, assignor to Monsanto Chemical Company, St. Louis, Mo., a corporation of Delaware No Drawing. Application November 14, 1947, Serial No. 786,147

6 Claims. (Cl. 260—461)

This invention provides a new and improved process for producing pentavalent polyphosphoric acid esters.

According to Paul Nylen (Diss. Upsala 1930) the reaction between diethyl phosphoryl chloride and sodium diethyl phosphite yields a mixture of esters wherein part of the phosphorus is present in the trivalent form and part thereof is present in the pentavalent form. There is good reason to believe that the reaction product produced according to this process, when equal molar quantities of diethyl phosphoryl chloride and sodium diethyl phosphite are employed, contains compounds having the structure:

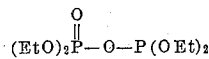

and may also contain compounds having all of the phosphorus in the trivalent form, e. g.,

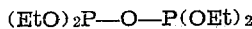

in addition to compounds in which all of the phosphorus is present in the pentavalent form.

It is possible to separate the normal tetraethyl pyrophosphate formed by the reaction from the compounds containing trivalent phosphorus by distillation and thus to obtain pure tetraethyl pyrophosphate. However, when this is done then a considerable quantity of crude product must be discarded which consequently lowers the yield of the product and increases the cost thereof. Furthermore, the proximity of boiling points requires a costly and elaborate fractional distillation.

I have now discovered that the reaction products containing neutral esters of pyrophosphoric acid or triphosphoric acid, which esters contain trivalent phosphorus atoms in the molecule may be converted to neutral esters containing pentavalent phosphorus by treating the reaction products with chlorine, whereby the trivalent phosphorus is oxidized to pentavalent phosphorus. The compounds formed by the addition of chlorine in this manner are neutral esters of chloro polyphosphoric acid. These products are then further reacted with an alcohol to yield the pentavalent phosphorus-containing ester and an alkyl chloride.

As stated above, either the crude reaction product resulting from the interaction of diethyl phosphoryl chloride and sodium diethyl phosphite may be treated with chlorine or the crude reaction product may be first distilled and the trivalent polyphosphoric acid esters thus separated are separately treated with chlorine. The trivalent phosphorus-containing esters boil at a lower temperature than does the neutral ester of polyphosphoric acid, wherein the phosphorus is present in the pentavalent form. Accordingly, when the reaction product is distilled the trivalent phosphorus-containing esters will be found in the forerun.

The following examples illustrate the present invention:

Example 1

One gram mole of diethyl phosphoryl chloride and one gram mole of sodium diethyl phosphite were mixed together in the cold and then gently warmed. Sodium chloride was precipitated and removed by filtration. The filtrate was distilled and a lower boiling fraction comprising about 25% of the reaction product and consisting of tetraethyl pyrophosphites obtained boiling at 90° C/2-3 mm. pressure.

The distillate comprises a mixture of compounds illustrated by formulae A and B above. Chlorine gas is now passed into the distillate in the cold until permanent color develops.

The chlorinated product obtained in this manner consists of a mixture of compounds having the following formulae:

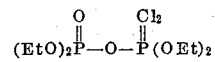

and

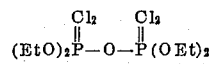

The mixture of chlorophosphoric acid esters is now treated with a slight excess of anhydrous ethanol employing good agitation. A vacuum is applied to the reaction mass which is then gently warmed, and ethyl chloride volatilized and removed from the product. The resulting product is freed of residual alcohol and comprises pure tetraethyl pyrophosphate boiling at 133–4° C./2.5 mm. pressure.

Example 2

The crude reaction product obtained from equal molar proportions of diethyl phosphoryl chloride and sodium diethyl phosphite obtained in the same manner as in Example 1 was treated in the cold with chlorine gas without prior separation of the trivalent phosphorus-containing compounds. After completion of the reaction, alcohol was added in slight excess and the ethyl chloride removed by distillation at low temperature. The product comprised tetraethyl pyrophosphate.

Example 3

The crude reaction product obtained by the action of sodium diethyl phosphite upon ethyl phosphoryl dichloride in the proportions of two moles of the former to one mole of the latter was treated with chlorine gas until a permanent color developed. The product was then treated with anhydrous ethanol and then ethyl chloride was removed by the application of a vacuum. The product remaining was substantially pure pentaethyl triphosphate having the formula:

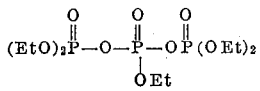

The above process may be applied generally to any neutral polyphosphoric acid esters where a part or all of the phosphorus is present in the trivalent form.

Since it is obvious that various changes and modifications may be made in the invention above set forth, without departing from the spirit thereof, this invention is not restricted to the specific details described except as defined in the appended claims.

What I claim is:

1. The process which comprises treating a neutral polyphosphoric acid ester containing trivalent phosphorus and selected from the class consisting of (a) the ester derived by the reaction of one mole of sodium diethyl phosphite with one mole of diethyl phosphoryl chloride and (b) the ester derived by the reaction of two moles of sodium diethyl phosphite with one mole of ethyl phosphoryl dichloride, with chlorine, whereby said trivalent phosphorus is oxidized to pentavalent phosphorus and thereafter treating the chlorinated product with an anhydrous alcohol.

2. The process of treating a neutral polyphosphoric acid ester product comprising trivalent phosphorus containing esters, said esters being selected from the class consisting of (a) the ester derived by the reaction of one mole of sodium diethyl phosphite with one mole of diethyl phosphoryl chloride and (b) the ester derived by the reaction of two moles of sodium diethyl phosphite with one mole of ethyl phosphoryl dichloride, with chlorine, whereby said trivalent phosphorus is oxidized to pentavalent phosphorus and thereafter treating said chlorinated product with an anhydrous alcohol.

3. The process which comprises treating a neutral polyphosphoric acid ester derived by the reaction of one mole of diethyl phosphoryl chloride with one mole of sodium diethyl phosphite, said ester containing trivalent phosphorus, with chlorine and thereafter treating the chlorinated product with an anhydrous alcohol.

4. The process which comprises treating a neutral polyphosphoric acid ester derived by the reaction of one mole of ethyl phosphoryl dichloride with two moles of sodium diethyl phosphite, said ester containing trivalent phosphorus, with chlorine, and thereafter treating the chlorinated product with an anhydrous alcohol.

5. The process which comprises treating the neutral tetrapyrophosphoric acid ethyl ester derived by the reaction of one mole of diethyl phosphoryl chloride with one mole of sodium diethyl phosphite, said ester containing trivalent phosphorus, with chlorine, and thereafter treating the chlorinated product with anhydrous ethyl alcohol and removing ethyl chloride therefrom.

6. The process which comprises treating the neutral triphosphoric acid ethyl ester derived by the reaction of one mole of ethyl phosphoryl dichloride with two moles of sodium diethyl phosphite, with chlorine, and thereafter treating the chlorinated product with anhydrous ethyl alcohol and removing ethyl chloride therefrom.

GENNADY M. KOSOLAPOFF.

REFERENCES CITED

The following references are of record in the file of this patent:

Arbusow et al.: "Jour. für. prakt. Chem.," vol. 130 (1931), page 113.

Arbusow et al.: "Jour. für. prakt. Chem.," vol. 131 (1931), pp. 337 to 341.